United States Patent [19]

Bardeen

[11] Patent Number: 5,092,050
[45] Date of Patent: Mar. 3, 1992

[54] HAND HELD SCRAPING DEVICE
[75] Inventor: John P. Bardeen, Denver, Colo.
[73] Assignee: Pumpkin, Ltd., Denver, Colo.
[21] Appl. No.: 607,150
[22] Filed: Oct. 31, 1990
[51] Int. Cl.[5] .............................................. A47J 43/28
[52] U.S. Cl. ........................................ 30/324; 30/169
[58] Field of Search ................... 30/324–328, 30/113.1, 147, 149, 150, 123.5, 169; 294/55; D7/653, 664

[56] References Cited
U.S. PATENT DOCUMENTS 3,004,341 10/1961 Carroll et al. .......................... 30/325
3,358,619 12/1967 Pareira ................................ 30/324 X Primary Examiner—Douglas D. Watts
Attorney, Agent, or Firm—Timothy J. Martin; Dana S. Rewoldt

[57] ABSTRACT

A hand held scraping device adapted for use by a person and having a handle portion and a concave scoop portion having a recess proximate the handle portion for receiving the user's thumb. This recess facilitates the user's grip and ability to manipulate the device. This recess can be further defined by a ridge and the side edges of the scoop. The scoop portion terminates in a distal cutting edge that extends transversely of the longitudinal axis. The scoop portion has a concavity with respect to a scoop plane. The distal cutting edge is upturned with respect to scoop plane when the concavity is upwardly opening. In the preferred embodiment the scoop portion includes a pair of side edges with an upturned side cutting edge. The scoop includes an interior scoop surface, a blunt flat distal end surface that is oriented transversely of the longitudinal axis and an exterior scoop portion. This flat distal end surface prevents inadvertent cuts and makes this scraper safer for child use. The distal end surface is oriented at an acute angle relative to the interior scoop surface forming the upturned cutting edge.

22 Claims, 2 Drawing Sheets

HAND HELD SCRAPING DEVICE

BACKGROUND OF INVENTION

1. Field of Invention

The present invention is directed to a scraping device and particularly to a hand-held scraping device adapted to be used to cut and remove soft materials. The scraper device may be manipulated to permit removal of soft material from objects with both irregular contour surfaces and from flat regular surfaces. This scraper device is specially constructed for use in the removal of the inner soft material of a pumpkin to adequately prepare the pumpkin for carving.

2. Description of Prior Art

In general, devices for scraping material have been developed in the past. In earlier times, scraping devices were fashioned of rock, bone or shell material and employed to remove blubber, animal fat or fleshy material from animal skins in order to prepare the skins for tanning or other conditioning. These scrapers were usually honed to have a front blade-like edge to facilitate removal of secured animal tissue and little concern was given to safety consideration. As society developed the uses of scraping devices have expanded, and scrapers are now commonly used to facilitate removal of such substances old paint, varnish, shellac, and the like. Further spoon-like utensils, spatulas, paddles and the like used in food preparation may sometimes function as a scraping device. The present invention is not believed to be present in any of the prior art.

SUMMARY OF THE INVENTION

It is an object of the present invention to provide a new and useful scraping device of improved construction which can be used to scrape and remove relatively soft materials from an object.

Yet another object of the present invention is to provide a safe tool, in the form of a scraping device, which children may use to remove soft materials from an object, such as a pumpkin, without real risk of injury.

It is another object of the present invention to provide an inexpensive, hand-held scraping device instructed as an integral piece of molded plastic.

A further object of the present invention is to provide a scraper device which can be held securely in the user's palm, four digits and thumb when slippery and slimy material (such as material from the interior of a pumpkin) is being scraped and removed.

Still another object of the present invention is to provide a recess on the scoop portion adapted to accept the user's thumb to guide and stabilize the scraper device during use.

It is also an object of the present invention to provide a scraper device with a front portion which is blunt and an upturned cutting edge on the front and side of the device adapted to scrape contoured and concave surfaces of an object.

The present invention accomplishes the above identified objects by providing a hand-held scraping device which is adapted for removal of soft materials. This scraper comprises a handle portion adapted to be held by the user and a concave scoop portion extending forwardly of the handle portion and terminating in a distal cutting edge. The scoop portion has a concavity with respect to a scoop plane defined by the scoop portion. The scoop portion terminates opposite of the handle portion in a distal cutting edge that extends transversely of the longitudinal axis of the handle portion. The distal cutting edge is upturned with respect to the scoop plane when the scoop portion is oriented with the concavity upwardly opening. The user may, with this construction, easily manipulate the scoop portion by means of the handle portion to advance the cutting edge along a surface of the object in a scraping motion so that the cutting edge cuts soft material therefrom for collection within the concavity.

In the preferred embodiment of the present invention, the scoop portion includes a pair of side edges that diverge forwardly of the handle portion. Each of the pair of side edges has an upturned side cutting edge adapted to cut away the soft material from the object adjacent to the upturned front cutting edge. Preferably, the concave scoop includes an interior scoop surface which is preferably formed in a smooth, uninterrupted radius, a distal end surface, and an exterior scoop surface formed in a radius that is the same as that of the interior surface but is formed about a center that is offset from the center defining the radius of curvature of the interior scoop surface. The distal end surface extends transversely of the longitudinal axis of the handle portion.

The distal end surface is oriented at an obtuse angle with respect to a margin of said exterior scoop surface adjacent to the distal end surface and at an acute angle with respect to the interior scoop surface, thus forming an upturned cutting edge. The distal end surface and upturned cutting edge permits the scoop to be employed by children with significantly less risk of injury.

To further facilitate the ability of children to use this scraper device the handle diverges rearwardly from the scoop portion. This handle portion maybe have a corrugated portion which permits the user to maintain a grip on the handle when soft, slippery material such as pumpkin seeds in being removed. The scoop portion also can define a recess configured to accept the user's thumb. This recess permits the user to more easily grip, guide and manipulate the device. The recess of the scoop portion can also include a ridge operative to facilitate tactile registration of the user's thumb within the recess.

These and other objects of the present invention will become more readily appreciated and understood from a consideration of the following detailed description of the preferred embodiment when taken together with the accompanying drawings.

DETAILED DESCRIPTION OF THE PREFERRED EMBODIMENT

The present invention is directed to a hand held scraping device which is particularly adapted for scraping and removing of soft materials from a surface of an object. Preferably, this tool is formed as a single, integrally molded piece of plastic material by any convenient molding process, such as injection molding. This tool is configured to permit it to be manipulated and held at various orientations while removing soft material. The tool is especially configured to be used in the relative tight confines within the interior of a pumpkin and has upturned forward and side cutting edges for removing the seed and pulp from the interior, somewhat spherical, shell of the pumpkin.

Figure 1:
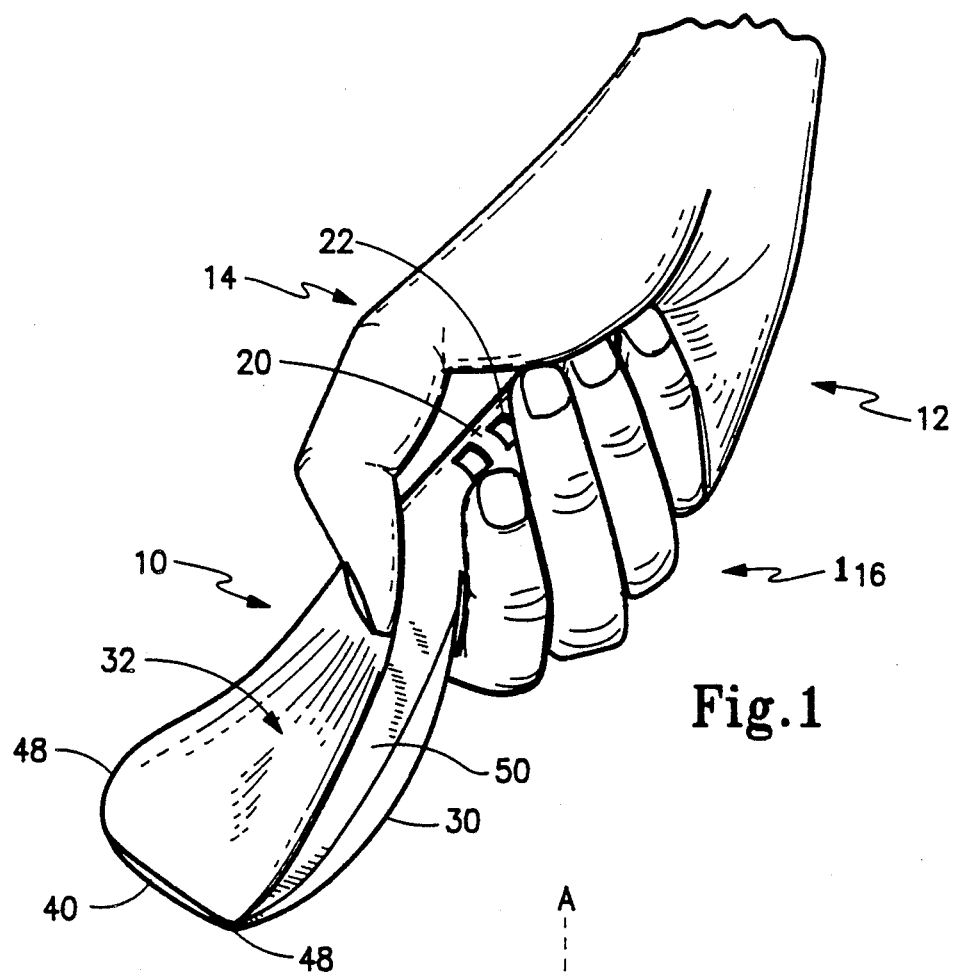
FIG. 1 is a perspective view of a scraping device according to the exemplary embodiment of the present invention with the scraping device being held in a user's hand.
Figure 2:
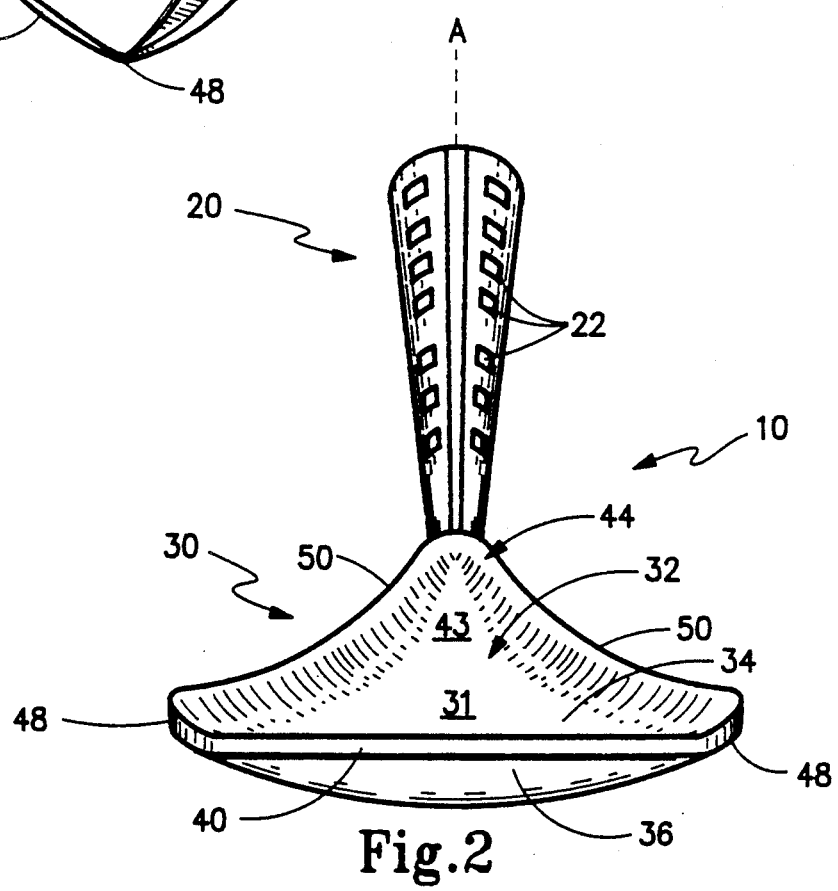
FIG. 2 is a top front perspective view of the scraping device according to the exemplary embodiment of the present invention.
Figure 3:
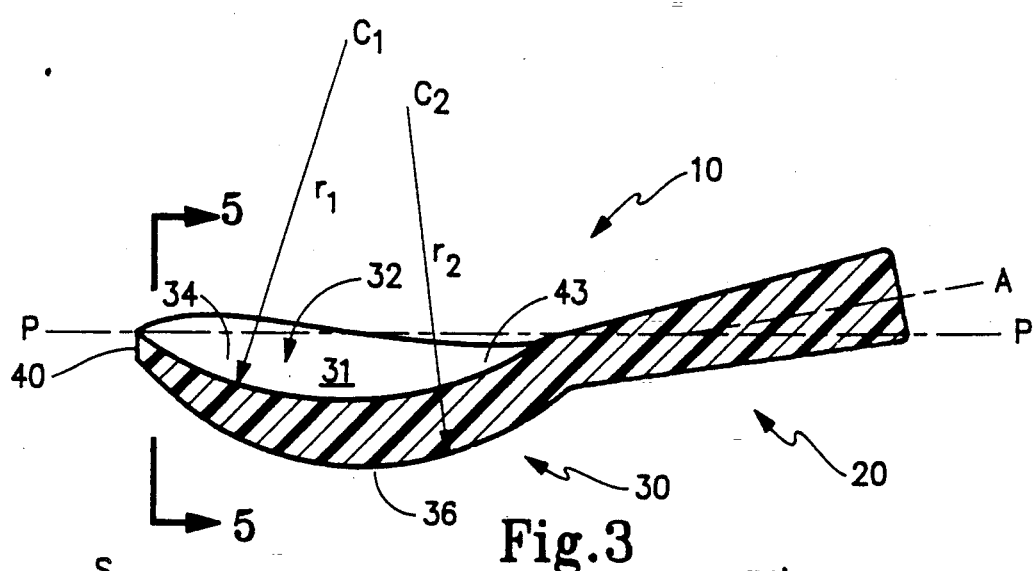
FIG. 3 is a side view in cross-section of the scraping device shown in FIG. 2.

As is best shown in FIGS. 1–3, this scraper device 10 broadly includes a handle portion 20 and a scoop portion 30. Accordingly, scraper device 10 is an instrument having a longitudinal axis A which passes axially through handle portion 20. It can be seen in FIG. 1 that the handle portion 20 is adapted to be gripped in the palm and fingers 16 of the user's hand 12 with the user's thumb 14 registered in a recessed area of scoop portion 30 proximate handle portion 20. Handle portion 20 diverges rearwardly of the scoop portion 30, as is shown in FIGS. 2 and 3, and includes corrugated portions 22 which enable the user to maintain a secure grip on the handle when scraping materials from the object as discussed below.

Scoop portion 30 is formed in a concave shape, thus having an interior scoop surface 34 defining a concavity 32 that opens upwardly when the scraping device is in the position shown in FIG. 3 with scoop plane P oriented horizontally. Scoop portion 30 is bounded by a pair of side edges 50 which diverge from one another forwardly of handle portion 20. A distal end surface 40 extends transversely of axis A and interconnects side edge surfaces 50 at arcuate corners 48. Thus, side edge surfaces 50 and distal end surface 40 define an elevated perimeter that bounds interior scoop surface 34. Further, it may be seen in these Figures that scoop portion 30 has an exterior surface 36 also bounded by side edge surfaces 50 and distal end surface 40.

With reference to FIG. 3, it may further be seen that the interior scoop surface 34 is a spherical section formed along a radius of curvature "$r_1$" extending from an imaginary center "$C_1$"; exterior scoop surface 36 is also a spherical section formed along a radius of curvature "$r_2$" extending from an imaginary center "$C_2$". Preferably $r_1$ and $r_2$ are equal radii of curvature, and centers $C_1$ and $C_2$ are offset from one another so that the thickness of scoop portion 30 (as measured between the interior and exterior scoop surfaces) diminishes in a forward direction from handle portion 20 to distal end surface 40. Interior surface 34 is preferably smooth and uninterrupted having a central area 31 and a proximal area 43 which is located proximate handle portion 20. As discussed more throughly below, proximal area 43 forms a recess 44 that receives the tip of the thumb, as shown in FIG. 1, since interior scoop surface 34 is formed along radius $r_1$, and since this spherical surface intersects the truncated conic cross-section of handle portion 20. On the other hand, exterior scoop surface 36 may be knurled or roughened, if desired.

Figure 4B:
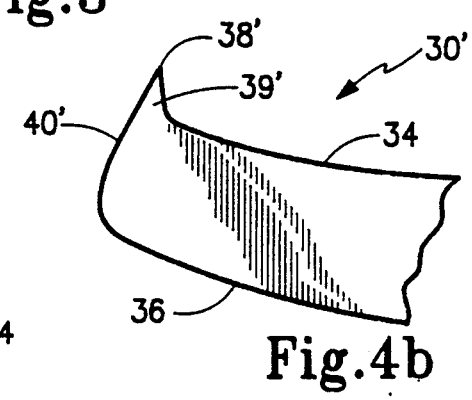
FIG. 4(b) is a diagrammatic view, similar to FIG. 4(a), but showing an alternating cutting edge construction.

Of particular emphasis in the present invention is the formation of an upturned cutting edge which enables the user to cut soft material from the contoured surface of an object for collection by concavity 32. With reference then to FIGS. 2, 4, and 5, it may be appreciated that distal end surface 40 intersects the interior scoop surface 34 to form a distal cutting edge 38 that comprises a forward segment of the cutting edge. Similarly, side edge surfaces 50 each intersect the interior scoop surface 34 to form side cutting edges 52. Distal cutting edge 38 interconnects the side cutting edges 52 to form a continuous upturned cutting edge 51 that extends completely along the forward edge of scoop portion 30 and rearwardly along the side edges of scoop portion 30 at least part of the distance between each corner 48 and handle portion 20. Thus a cutting edge 51 which includes the distal and side cutting edge defines at least a portion of the elevated perimeter that bounds interior scoop surface 34.

Figure 4A:
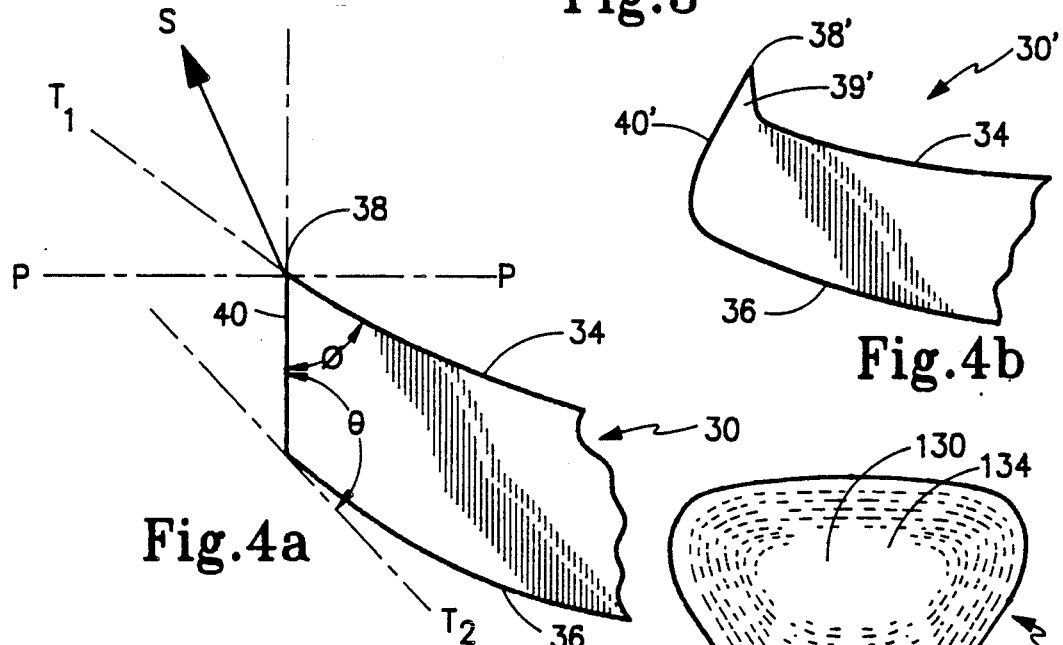
FIG. 4(a) is an enlarged diagrammatic cross-section view of the distal end of the scraping device shown in FIG. 1 showing the orientation of the upturned cutting edge.
Figure 5:
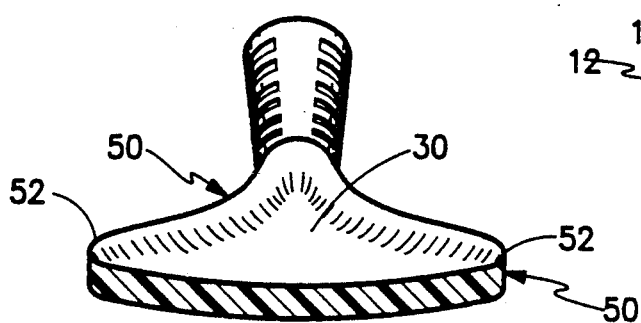
FIG. 5 is a front end in cross-section showing the side cutting edges of the scoop portion of the scraping device of FIGS. 2 and 3.

As is shown diagrammatically in FIG. 4(a), the interior scoop surface 34 intersects distal end surface 40 to form the distal cutting edge 38. With reference to this diagrammatic cross-section, it may now be appreciated that interior scoop surface 34 has a tangent $T_1$ at a point of intersection with distal end surface 40 and, likewise, exterior scoop surface 36 has a tangent $T_2$ at a point of intersection with distal end surface 40. Distal end surface 40 is formed approximately perpendicularly to plane P. Accordingly, interior scoop surface 34 is oriented at an acute angle 0 (measured to tangent $T_1$) with respect to distal end surface 40. On the other hand, exterior scoop surface 36 is oriented at an obtuse angle $\theta$ (measure to tangent $T_2$) with respect to distal end surface 40. Therefore, distal cutting edge 38 has a cutting direction S extending upwardly and forwardly of scoop portion 30 along the bisection of angle 0. Angles 0 and $\theta$ may be varied either by respectively changing the radii $r_1$ and $r_2$ or by changing the relative orientation of distal end surface 40 to plane P. Angle 0 is preferably in the range of 25° to 80°, depending upon the sharpness desired for the cutting edge. Angle $\theta$ is preferably in the range of 100° to 160° to avoid formation of any cutting edge along exterior surface 36.

It should also be understood that a lip could be formed, if desired, to create a specially configured cutting edge, such as upturned cutting edge 38', shown diagrammatically in FIG. 4(a). Here, Lip 39' is formed along the intersection of interior scoop surface 34 and distal end surface 40 so that cutting direction S' is generally perpendicular to plane P'.

In either case represented by FIGS. 4(a) and 4(b), it should be understood that the side cutting edges 52 are formed in a similar manner as distal cutting edge 38 (or 38'). Thus, by way of example, it may be seen in FIG. 5 that side cutting edges 52 are upturned with respect to plane P.

This scraper device has various structural elements adapted to facilitate the user's control of the device and the user's ability to remove the collected soft material from the device. Handle portion 20 as shown in FIG. 1 and FIG. 5 is adapted to be held in the user's hand and encompassed by the user's fingers. The handle portion 20 has a corrugation portion 22 which facilitates the user's gripping of the handle portion 20 in the palm and fingers. This corrugation 22 is especially helpful when the user is removing material as slippery and as messy as pumpkin pulp.

Figure 6:
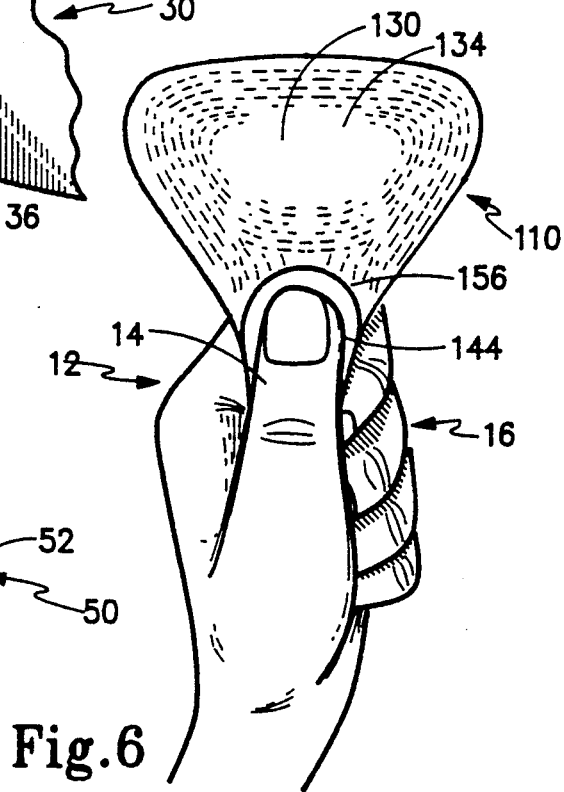
FIG. 6 is a top plan view of scraping device, again held in a user's hand, and including the optional thumb registering ridge.

The user's grip and the ability to manipulate the scraping device is further enhanced by a thumb receiving area 43. The scoop portion 30 proximate to the handle portion 20 defines a recess 44 configured to accept the user's thumb. A portion of the divergent side edges 50 proximate to the handle portion 20 define the outer boundary 54 of the recess 44. The recess 44 of the scoop portion 30 can include an optional ridge 156, shown in FIG. 6. Rige 156, as provided, is operative to facilitate tactile registration of the user's thumb within the recess 44. In any event, the recess 44 permits the user to place his thumb in the scoop portion 30 enhancing the user's ability to control manipulation of scoop portion 30 in a variety of motions along a surface of the object and thereby to advance the cutting edge in a craping motion so that the soft material can be collected in the concavity 32 of the scoop portion 30. Side cutting edges 52 permit the user to advance the cutting edge 51 along crevices and ridges and angled surfaces within ghe object. Thus, the user can scrape more than one surface with the same scraping motion.

Since the cutting edges are upturned, they are positioned to prevent inadvertent injury where the user is a child. Distal end surface 40 forms a blunt, flat region that projects laterally outwardly from the scoop portion 30. This blunt surface also increases child safety.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A hand held scraper adapted for removal of soft material from an object by a user comprising:
    a handle portion having a longitudinal axis and adapted to be held by a user; and
    a concave scoop portion having a concavity with respect to a scoop plane defined by said scoop portion, said concave scoop portion connected to and extending forwardly of said handle portion to terminate in a flattened end that extends transversely of the longitudinal axis and that has a distal cutting edge which is upturned with respect to the scoop plane when said scoop portion is oriented with the concavity upwardly opening whereby the user may manipulate said scoop portion by means of said handle portion to advance the cutting edge along a surface of said object in a scraping motion so that the cutting edge cuts soft material therefrom for collection within the concavity of said concave scoop portion.

2. A scraper in accordance with claim 1 wherein said scoop portion has a pair of side edges that diverge forwardly of said handle portion.

3. A scraper in accordance with claim 2 wherein said pair of side edges each include an upturned side cutting edge wherein soft material can be cut away from the object by said side cutting edges.

4. A scraper in accordance with claim 3 wherein said distal cutting edge interconnects said pair of upturned side cutting edges.

5. A scraper in accordance with claim 1 wherein said concave scoop includes an interior scoop surface, an exterior scoop surface, and a distal end surface, said distal end surface intersecting said interior scoop surface to form the distal cutting edge.

6. A scraper according to claim 5 wherein said exterior scoop surface has a margin adjacent said distal end surface, said distal end surface being oriented at an obtuse angle with respect to said margin.

7. A scraper according to claim 6 wherein said interior scoop surface is oriented at an acute angle with respect to said distal end surface forming an upturned distal cutting edge.

8. A scraper according to claim 5 wherein said interior and exterior scoop surfaces have equal radii of curvature.

9. A scraper according to claim 5 wherein said interior scoop surface is smooth and uninterrupted.

10. A scraper according to claim 1 wherein said handle portion continuously diverges rearwardly from said scoop portion.

11. A scraper according to claim 1 wherein said handle portion has corrugated portions whereby the user can maintain a grip the handle portion.

12. A scraper according to claim 1 wherein said handle portion and said scoop portion are molded as an integral one-piece plastic construction.

13. A scraper according to claim 1 wherein said scoop portion proximate to said handle portion defines a recess configured to accept the user's thumb.

14. A scraper according to claim 13 wherein said recess of said scoop portion includes a ridge operative to facilitate tactile registration of a thumb of the user within the recess.

15. A hand held scraper adapted for removal of soft material from the surfaces of an object by a user comprising:
    a handle portion having a longitudinal axis and adapted to be held by the user; and
    a scoop portion connected to and extending forwardly of said handle portion and having a central region surrounded by an elevated perimeter to form a concavity, said perimeter having a distal edge located forwardly of said handle portion and extending transversely of the longitudinal axis and a pair of side edges, the distal edge and a portion of each side edge proximate the distal edge forming a cutting edge whereby the user may manipulate said scoop portion by means of said handle portion to advance the cutting edge along the surfaces of said object in a scraping motion so that the cutting edge cuts soft material therefrom for collection within the scoop portion.

16. A scraper according to claim 15 wherein said scoop portion proximate to said handle portion defines a recess configured to accept the user's thumb.

17. A scraper according to claim 16 wherein said scoop portion includes a curved exterior scoop surface and a curved interior scoop surface.

18. A scraper according to claim 17 wherein said interior and exterior scoop surfaces have equal radii of curvature.

19. A scraper according to claim 17 wherein said recess of said scoop portion includes a ridge on the interior scoop surface that is defining the perimeter of the recess operative to facilitate tactile registration of a thumb of the user within the recess.

20. A scraper operative to be held in and manipulated by a user's hand to remove soft material from an object, comprising:
- a handle portion configured to be grasped by the hand and molded out of a plastic material so that said handle portion has a longitudinal axis; and
- a concave scoop portion having a concave scoop surface defining a concavity with respect to a scoop plane defined by said scoop portion, said concave scoop portion molded integrally with said handle portion out of said plastic material and connected to and extending immediately forwardly of said handle portion to terminate in a distal cutting edge that extends transversely of the longitudinal axis, said concave scoop surface, when upwardly opening, curving upwardly and laterally outwardly to terminate at side edge surfaces which thereby form a thumb receiving area proximate to the handle portion that defines a recess configured to accept the user's thumb whereby the user may grasp the handle portion with the thumb positioned in said recess thereby to efficiently manipulate said scoop portion by means of said handle portion to advance the cutting edge along a surface of said object in a scraping motion so that the cutting edge cuts soft material therefrom for collection within the concavity.

21. A scraper according to claim 20 wherein said handle portion has corrugated portions thereby facilitating the user's a grip on the handle portion when cutting and removing soft, slippery material from an object.

22. A scraper according to claim 20 including a ridge extending along a portion of said recess and operative to facilitate tactile registration of the user's thumb within the recess.

* * * * *